US005188020A

United States Patent [19]

Buchnag

[11] Patent Number: 5,188,020

[45] Date of Patent: Feb. 23, 1993

[54] FOOD SHELVING AND CYCLING SYSTEM

[76] Inventor: Kamal M. Buchnag, P-4, 3700 Sutherland Ave., Knoxville, Tenn. 37919

[21] Appl. No.: 775,775

[22] Filed: Oct. 11, 1991

[51] Int. Cl.[5] ........................ A47F 1/00; B65G 60/00; G07F 11/00

[52] U.S. Cl. ........................................ 99/468; 99/335; 99/357; 99/476; 99/483; 99/484; 186/55; 219/214; 221/150 HC; 221/150 A; 312/236

[58] Field of Search ................. 99/325, 334, 335, 331, 99/338, 357, 359, 360, 443 C, 474, 476, 468, 483, 484; 221/150 R, 150 A, 150 HC; 186/56, 55, 52, 49, 38; 312/236; 219/214

[56] References Cited

U.S. PATENT DOCUMENTS

| | | | |
|---|---|---|---|
| 1,777,269 | 9/1930 | Webber | 221/150 R |
| 2,363,724 | 11/1944 | Ford | 99/357 |
| 2,831,419 | 4/1958 | Timm | 99/357 |
| 2,885,115 | 5/1959 | Stiller | 186/55 |
| 3,143,247 | 8/1964 | Blake | 186/55 |
| 3,443,509 | 5/1969 | Sandy | 99/357 |
| 3,719,408 | 3/1973 | Fullington et al. | 312/236 |
| 3,911,248 | 10/1975 | Buday et al. | 219/214 |
| 4,030,632 | 6/1977 | Harashima | 221/150 A |
| 4,036,401 | 7/1977 | Nachtigall, Jr. | 219/214 |
| 4,848,591 | 7/1989 | Wada | 221/150 A |

FOREIGN PATENT DOCUMENTS

| | | | |
|---|---|---|---|
| 2134503 | 8/1984 | United Kingdom | 221/150 R |

*Primary Examiner*—Timothy F. Simone
*Attorney, Agent, or Firm*—Luedeka, Hodges, Neely & Graham

[57] ABSTRACT

A food shelving and cycling system for wrapped food items includes an elongated shelf for storing wrapped food items and unwrapping apparatus for separating each food item from its wrapping. Sensors mounted within the floor of the shelf and a controller monitor the time that a wrapped food item is positioned within the shelf and initiates its removal from the shelf if the food item is positioned within the shelf in excess of a desired period of time. The system includes heating components for heating the food items until removed from the shelf, and the unwrapping apparatus facilitates the division of a food item and its wrapping into edible and non-edible refuse.

17 Claims, 4 Drawing Sheets

FOOD SHELVING AND CYCLING SYSTEM

BACKGROUND OF THE INVENTION

This invention relates generally to the storing of food and relates, more particularly, to the shelving of wrapped foods, such as wrapped sandwiches, until removed for consumption or disposal.

In fast food restaurants, food which may be wrapped in either box-like containers or thin sheets of wrapping material is commonly prepared and wrapped in advance of an expected sale. Once prepared, the wrapped food items are commonly stocked behind a counter so that upon the sale of an item, the item is removed from the collected stock for passage to the customer. It is not uncommon that wrapped food items are stocked in a shelf which is sloped from back to front so that food items which are removed from the front of the shelf are replaced by food items placed through the back of the shelf thereby removing the food items from the shelf on a first-in, first-out basis.

It is an object of the present invention to provide a new and improved system having a shelf upon which wrapped food items are stored until sold and including means for removing a food item from the shelf which has been positioned upon the shelf longer than a predetermined period of time.

Another object of the present invention is to provide such a system wherein the stored food items can be heated.

Still another object of the present invention is to provide such a system for storing a large number of wrapped food items.

A further object of the present invention is to provide such a system facilitating the separation of unsold food items from their wrappings to separate edible refuse from non-edible refuse.

A still further object of the present invention is to provide such a system wherein an unsold food item which has been separated from its wrapping is cut into small pieces.

A yet further object of the present invention is to provide such a system wherein wrappings of the wrapped food items are either cleaned, shredded or collected for disposal.

One more object of the present invention is to provide such a system which is uncomplicated in construction and effective in operation.

SUMMARY OF THE INVENTION

This invention resides in a shelving and cycling system for a wrapped food item.

The system includes a frame and an elongated shelf upon which a wrapped food item is stored. The shelf has an entrance end through which a wrapped food item is placed into the shelf and an exit end through which a wrapped food item is removed from the shelf. The shelf is supported by the frame in a canted orientation so that a wrapped food item placed within the shelf through the entrance end is gravitationally directed toward the exit end of the shelf.

The system also includes a gate assembly associated with the shelf including a gate movably mounted adjacent the exit end of the shelf for movement between a closed position at which the gate prevents the food item from exiting the shelf through the exit end thereof and an opened position at which the food item is permitted to gravitationally move through the exit end of the shelf. The gate also includes means for moving the gate between its opened and closed positions, and means are associated with the gate moving means for initiating movement of the gate to its opened position upon the occurrence of a predetermined event to permit the food item to gravitationally exit the exit end of the shelf.

DETAILED DESCRIPTION OF THE ILLUSTRATED EMBODIMENT

Figure 1:
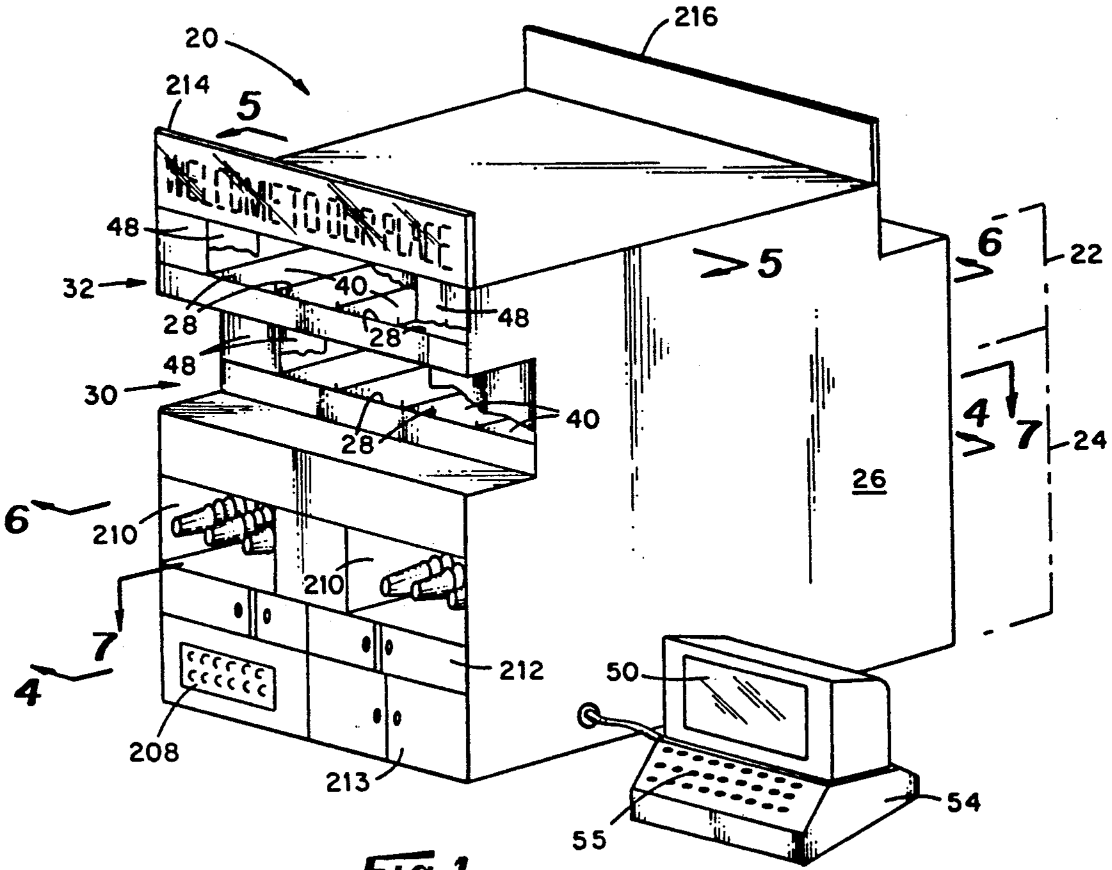
FIG. 1 is a perspective view of a food shelving and cycling system embodying features of the present invention, shown cut-away.

Turning now to the drawings in greater detail, there is illustrated in FIG. 1 an embodiment, generally indicated 20, of a system within which features of the present invention are incorporated. The system 20 includes an upper section 22 within which wrapped food items are warmed and stored for a predetermined period of time and a lower section 24 within which unsold food items are routed. Within the lower section 24, the food items and wrappings are divided into edible and non-edible refuse, and the separated wrappings are cleaned, shredded or collected for disposal.

Figure 2:
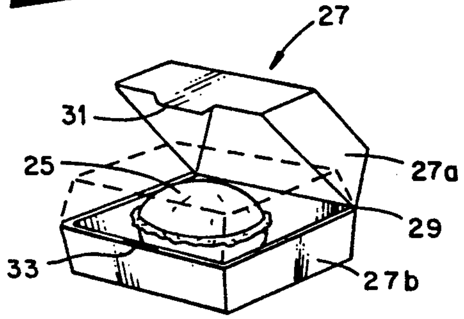
FIG. 2 is a perspective view of a food item positioned within one type of wrapping.
Figure 3:
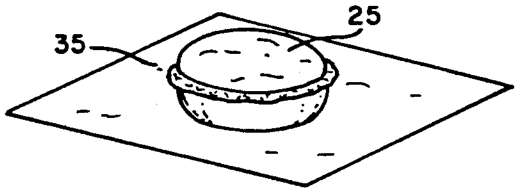
FIG. 3 is a perspective view of a food item positioned within another type of wrapping.

With reference to FIGS. 2 and 3, There are shown two types of wrapping for a food item, such as a sandwich 25, with which the system 20 is intended to be used. In FIG. 2, the wrapping is in the form of a box-like container 27 constructed, for example, of cardboard or Styrofoam® having a top portion **27*a* and a bottom portion 27*b* which are hinged together along one side 29 of the container 27 and a tab 31 on the side of the container 27 opposite the side 29 for releasably locking the top and bottom portions 27*a*, 27*b* together. In this connection, the bottom portion 27*b* has a slot 33 for receiving the tab 31 when the top portion 27*a* is moved from its opened condition, as illustrated in solid lines in FIG. 2, to its closed condition, as illustrated in phantom in FIG. 2**, and into an interlocking relationship.

In FIG. 3, the wrapping is in the form of a thin sheet 35 of wrapping material, such as wax paper or aluminum foil. To wrap the food item 25 with the sheet 35, the food item 25 is centered upon the sheet 35 and the corners of the sheet 35 are moved upwardly and across the food item 25 to gather the sheet 35 about the food item 25. When gathered in this manner, creases are formed in the sheet 35 which help to maintain the sheet 35 about the food item.

Figure 4:
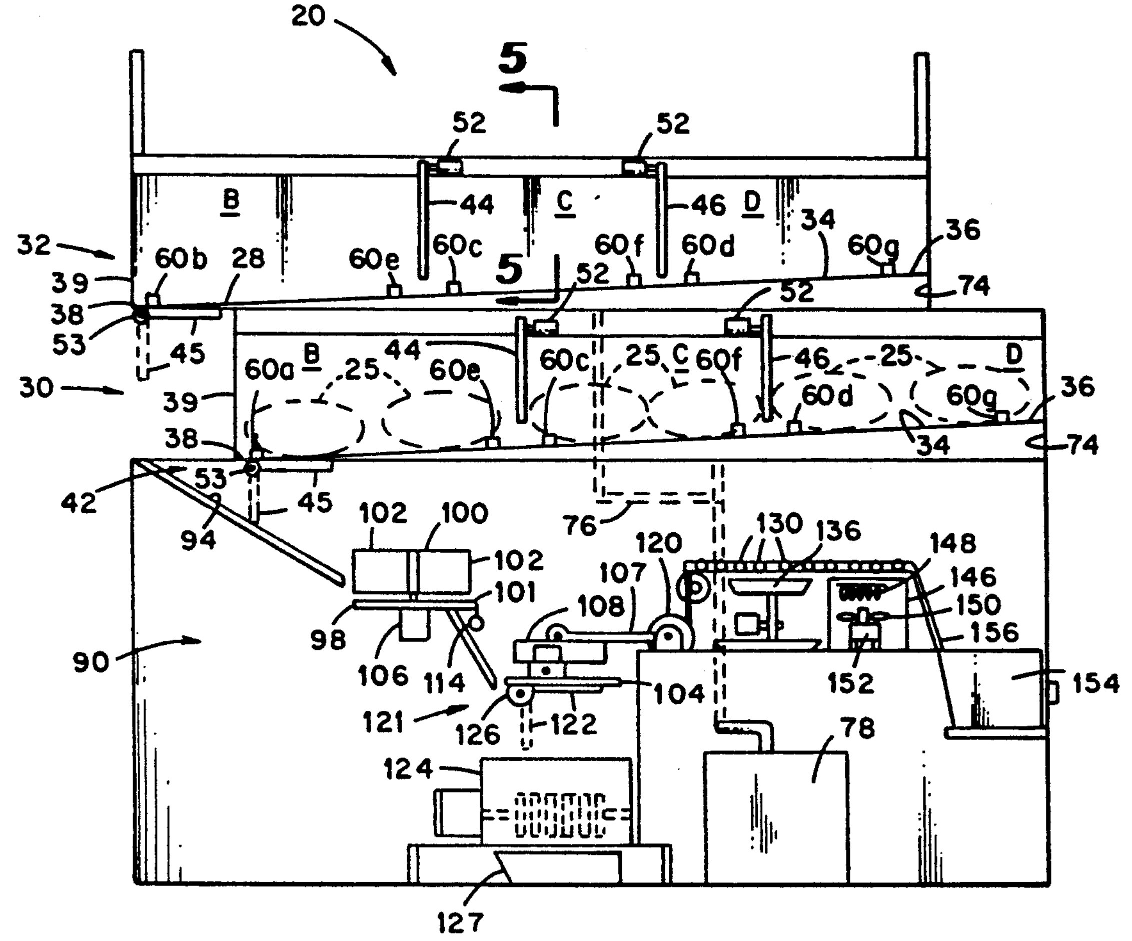
FIG. 4 is a cross-sectional view taken about line 4—4 of FIG. 1 illustrating schematically various components including one unwrapping means of the FIG. 1 system.

With reference to FIGS. 1 and 4, the system 20 includes a frame 26 within which the upper section 22 is supported, and the upper section 22 includes shelf means including a plurality of elongated shelves 28 into which wrapped food items can be placed for storage and for ready access. In the system 20, the shelf means includes a lower set 30 of shelves 28 and an upper set 32 of shelves 28 superposed upon the lower set 30. Each shelf 28 is elongated with a planar floor 34 having two opposite ends 36, 38 and is canted with respect to the horizontal so that food items placed in one end of the shelf 28 are gravitationally directed toward the other end of the shelf 28. As will be apparent herein, one shelf end 36 (i.e., the higher end) provides an entrance end for the shelf 28 into which food items are placed into the shelf and the other shelf end 38 (i.e., the lower end) provides an exit end for the shelf 28 through which the food items exit the shelf. As best shown in FIG. 1, the shelves 28 in each set 30 or 32 are arranged in a side-by-side relationship and separated from one another by dividers 40.

Figure 5:
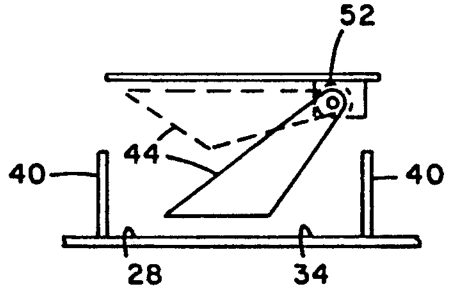
FIG. 5 is a schematic cross-sectional view taken about line 5—5 of FIG. 4.

The entrance end 36 of each shelf 28 is open to permit the placement of food items therethrough, and there is associated with each shelf 28 gate means 42 for halting the advance of food items along the length of the shelf 28. At the exit end 38 of each shelf 28 is an abutment wall 39 over which a food item 25 may be lifted for passage to a customer and a hinged door 48 through which a food item may be grasped. In the depicted system 20, the gate means 42 includes a pair of gates 44, 46 disposed at preselected positions along the length of each shelf 28 and a trap door gate 45 mounted in the floor 34 of each shelf 28 adjacent the wall 39. Each gate 45 is movable between a closed position as illustrated in solid lines in FIG. 4 to an open position as illustrated in phantom lines in FIG. 4. When in its opened position the gate 45 permits a food item situated therein to fall from the exit end 36. Each gate 44 or 46 is mounted for movement between a closed position as illustrated in solid lines in FIGS. 4 and 5 at which the gate 44 or 46 blocks the advance of a food item along the shelf 28 toward the exit end 36 and an opened position as illustrated in phantom in FIG. 5 at which a food item is permitted to slidably advance along the shelf 28 past the gate 44 or 46. In the depicted system 20, each gate 44 or 46 is attached to the shaft of a reversible servomotor 52 mounted adjacent each gate 44 or 46. The trap door gate 45 is hingedly supported by the shelf 28 beneath the plane of the floor 34 and is suitably geared to a reversible servomotor 53 mounted adjacent the gate 45. Operation of the servomotors 52, 53 is controlled by a controller 54 (FIG. 1) described hereinafter.

In the system 20, the controller 54 is a programmable computer which moves the gates 44, 45, 46 between opened and closed positions to either halt the advance of food items along the shelf 28 or to permit the food items to slidably advance along or off of the shelf 28 upon the occurrence of a predetermined event. In the depicted system 20, the gate 45 is opened upon the passage of a predetermined amount of time that a food item is positioned within the shelf 28, and the gates 44, 46 are opened when the shelf 28 is devoid of food items in advance of the gate 44 or 46. To this end, there is disposed along the shelf floor 34 a plurality of sensor switches 60*b*, 60*c*, 60*d* appropriately wired to the controller 54 for sensing the presence of a food item resting upon the switch and for measuring, with appropriate timing circuits within the controller 54, the amount of time that a food item is positioned within the shelf 28. The controller 54 also includes memory circuits for storing input information relating to the maximum amount of time that a food item is desired to be stored within the shelf 28 and comparison circuits for comparing the measured time that a food item is positioned within the shelf 28 against a predetermined amount of time that has been preprogrammed into the memory circuits. As best shown in FIG. 1, the controller 54 includes a keyboard 55 with which time limits can be input into the memory circuits.

As best shown in FIG. 4, each shelf 28 is separated by the gates 44, 46 into three compartments B, C, D which are each sized to hold two wrapped food items 25. Each sensor 60*b*, 60*c* or 60*d* is mounted in the shelf floor 34 adjacent the lower end of each compartment B, C or D for sensing the presence of a food item in its corresponding compartment B, C or D. The controller 54 is preprogrammed to maintain food items within the compartment B if food items are positioned within the shelf 28 at all. Accordingly, until the controller 54 senses, by way of the sensor 60*b*, the presence of a food item within compartment B, the controller 54 maintains gates 44 and 46 in an opened position. Upon sensing of a food item within compartment B, the gate 44 is closed, and upon sensing of a food item within compartment C, the gate 46 is closed. Preferably, the food items are inserted two-at-a-time into the shelf to ensure that each compartment is filled before the gate 44 or 46 is closed, but if desired, sensors 60*e* 60*f* and 60*g* can be mounted adjacent the upper end of the compartments B, C, D and appropriately wired to the controller 54 so that the gate 44 or 46 is not closed until the compartment B or C is filled.

An understanding of the timing operations of the controller 54 may best be had by a description of the operation of the upper section 22 of the system 20. At the outset of a shelf-filling process, the gate 45 is closed and the gates 44 and 46 are opened to permit the first food items to travel directly from the entrance end 36 to a position of rest within compartment B. With a food item resting upon sensor 60*b*, the controller 54 begins measuring the time that the food items are positioned within the compartment B. Similarly, when food items are inserted into the shelf 28 and come to rest within compartments C and D, the controller 54 begins measuring the time that food items are positioned within these compartments. If food items are pulled from the compartment B for passage to a customer, the time measurement of the food items positioned within the B are cleared from the controller 54, and the gates 44 and 46 are opened and closed in sequence so that the food items positioned within compartment C advance to compartment B, and the food items positioned within compartment D advance to compartment C.

If, on the other hand, the controller 54 determines by way of its comparison circuits that the food items positioned within the compartment B exceeds the desired amount of time that the food items should be positioned therein, the controller 54 sends appropriate command signals to the servomotor 53 so that the gate 45 is opened and the food items are permitted to gravitationally exit the compartment B. Upon passage of a prescribed amount of time sufficient to permit the passage of the food items from the compartment B, the controller 54 sends appropriate command signals to the servomotor 53 to close the gate 45. Upon closing of the gate 45, the gates 44 and 46 are opened and closed in sequence so that the food items positioned within compartment C advance to compartment B, and the food items positioned within compartment D advance to compartment C. It will be understood, however, that the controller 54 continues to monitor the amount of time that the food items which remain within the shelf 28 as the food items advance from one sensor switch to another sensor switch. Accordingly, the amounts of time that one food item rests upon a sensor switch within compartments D, C and B are added together by the controller 54 for comparison to a desired time limit. A further feature of the controller 54 is that, with information collected with the sensor switches, it can provide a continued count of the number of food items positioned in any shelf 28 and continually display the count on display 50.

Figure 6:
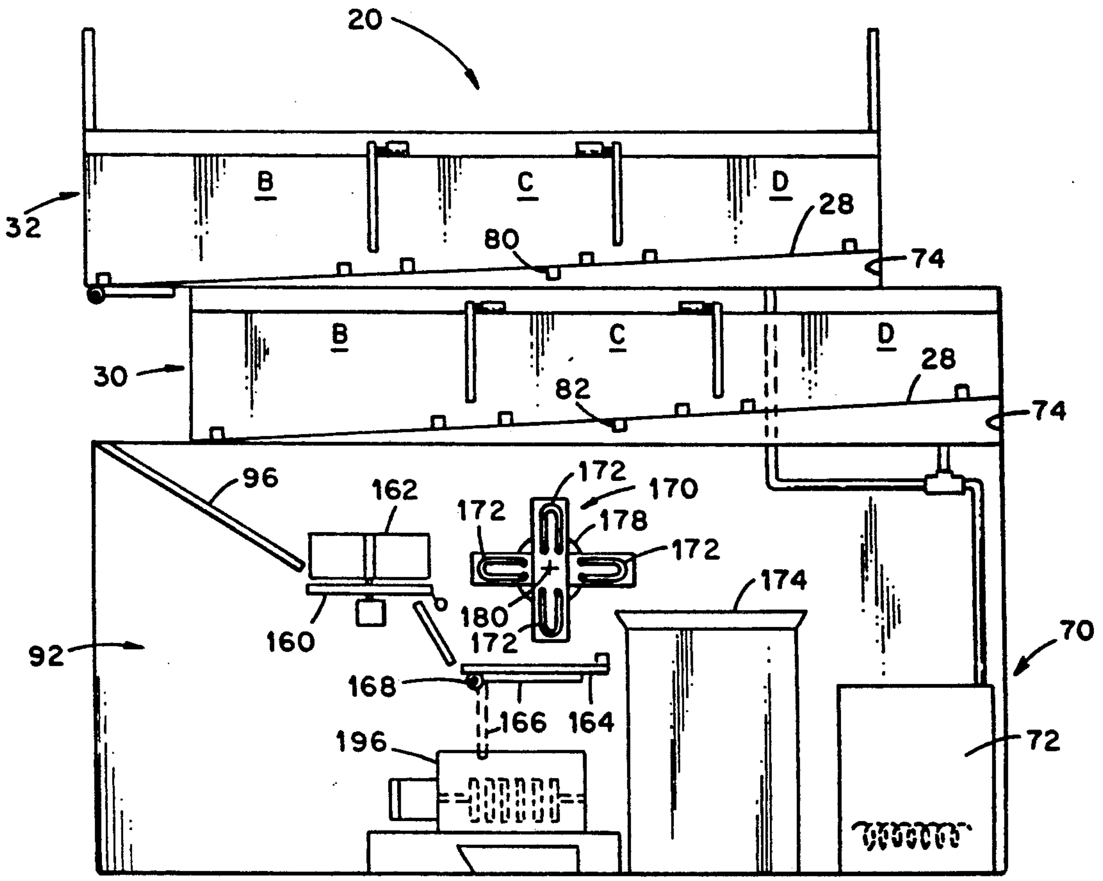
FIG. 6 is a cross-sectional view taken about line 6—6 of FIG. 1 illustrating schematically various components including another unwrapping means of the FIG. 1 system.

With reference to FIG. 6, the system 20 also includes heating means 70 associated with the upper section 22 for warming the food items positioned within the shelves 28. In the depicted system 20, the heating means 70 includes an electric steam generator 72 for routing steam against the underside of the floor of each shelf is a metal-lined cavity 74 joined in flow communication with the steam generator 72 so that the steam generated by the generator 72 is routed into the cavities 74 for heating the floors of the shelves 28 and thereby heating the food items positioned upon the shelves 28. Connected between each cavity 74 and generator 72 are appropriate conduits and valves whose construction is known in the art for delivering of the steam from the generator 72 to each cavity 74. As shown in FIG. 4, a drain pipe 76 is connected between each cavity 74 and the generator 72 for draining condensed steam from the cavities 74. If desired, a vacuum pump 78 may be joined to the drain pipe 76 for actively drawing the condensed steam from the cavities 74.

The operation of the steam generator 72 of FIG. 6 is controlled by the controller 54. Preferably, thermostats 80, 82 are mounted within the cavities 74 and appropriately wired to the controller 54 for controlling, by means of the steam generator 72, the internal temperature of the cavities 74, and in turn, the temperature of the floor of each shelf in a set 30 or 32.

Figure 7:
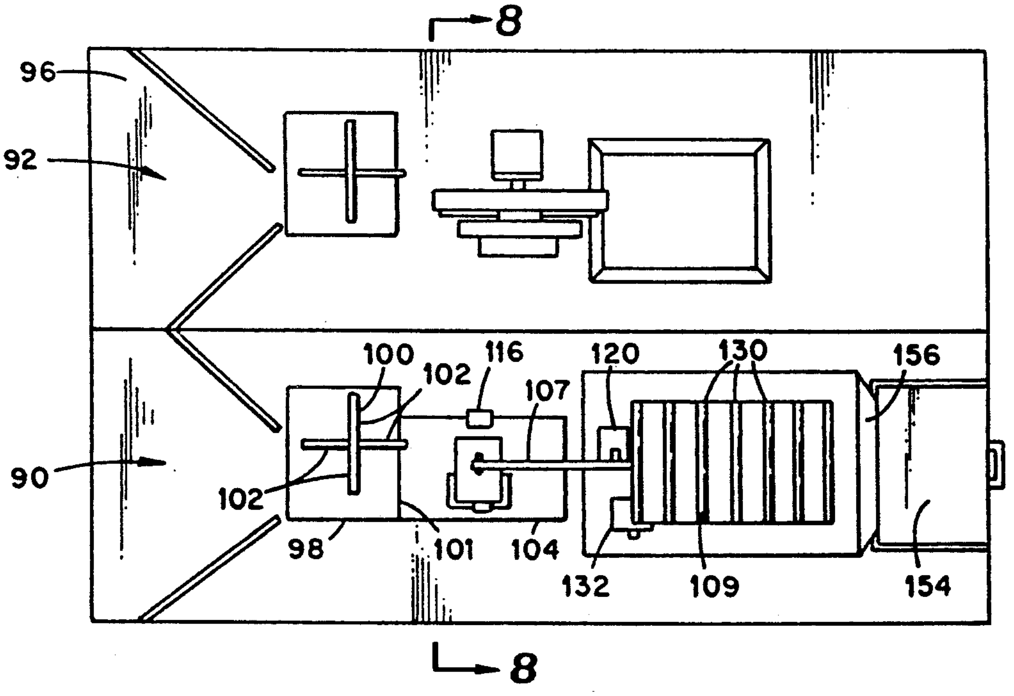
FIG. 7 is a cross-sectional view taken about line 7—7 of FIG. 1 illustrating schematically the two unwrapping means of the FIG. 1 system.

With reference to FIGS. 4, 6 and 7, there is shown mounted within the lower section 24 of the system 20 means, indicated 90, for unwrapping food items from box-like packages 27 of FIG. 2 and means, indicated 92, for unwrapping food items from a wrapping material sheet 35 of FIG. 3. In this connection, food items which are wrapped in box-like packages 27 are directed to unwrapping means 90 of FIG. 4 and the food items which are wrapped in sheets 35 are directed to the unwrapping means 92 of FIG. 6. To this end, the system 20 includes a chute 94 for funneling box-wrapped food items which fall off of the rightwardmost shelves 28, as viewed in FIG. 1, to the unwrapping means 90, and includes a chute 96 for funneling sheet-wrapped food items which fall off of the leftwardmost shelves 28, as viewed in FIG. 1, to the unwrapping means 92. Accordingly, an operator who places food items within the shelves 28 must place box-wrapped items into the rightwardmost shelves 28 and place sheet-wrapped items into the leftwardmost shelves 28.

With reference to FIG. 4, the unwrapping means 90 includes a platform 98 to which food items are directed by the chute 94, and there is mounted upon the platform 98 a revolving rack 100 having four paddles 102 joined to one another so as to divide the platform surface into four quadrant sections. The rack 100 is disposed upon the platform 9B and the paddles 102 are of such size that the opening provided between adjacent paddles 102 accept one food item from the chute 94. Therefore, by rotating the rack 100 in one rotational direction about its center (or counter-clockwise as viewed in FIG. 7), food items are removed one-at-a-time from the chute 94 and conveyed in this manner off the back edge 101 of the platform 98 onto a lower platform 104. A motor 106 mounted beneath the platform 98 is connected in driving relationship with the rack 100 for rotating the rack when the motor 106 is energized. The motor 106 is appropriately wired to the controller 54 for controlling the operation of the motor 106.

When positioned upon the lowered platform 104, the food item is positioned in registry with a U-shaped bracket 108 for capturing the top portion **27*a* (FIG. 2) of the box-like container 27. In the depicted system 20, the bracket 108 is pivotally mounted upon a pivot arm 107 for pivotal movement about a pin 111 between a lowered condition, illustrated in solid lines in FIG. 9, at which the U of the bracket 108 is in a condition for accepting the top portion 27*a* of the food item container directed onto the platform 104 and a raised condition, illustrated in phantom in FIG. 9, at which the bracket 108 is in a position for depositing the container 27 upon a conveyor 109**.

Figure 8:
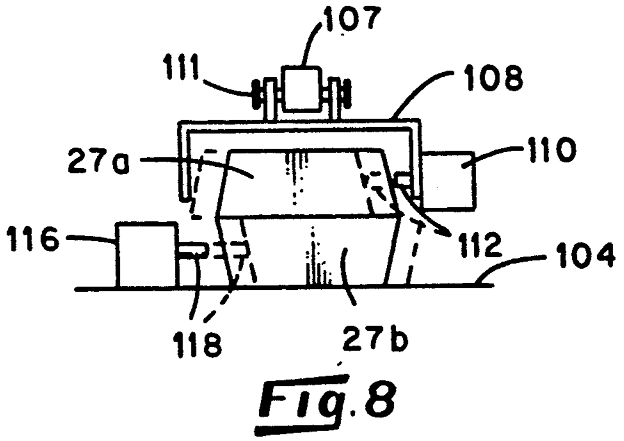
FIG. 8 is a fragmentary cross-sectional view taken about line 8—8 of FIG. 7.

As best shown in FIG. 8, there is mounted upon one side of the bracket 108 a solenoid 110 having a plunger 112 directed toward the opposite side of the bracket 108 and which is movable inwardly and outwardly between a retracted position as illustrated in solid lines in FIG. 8 and an extended positions as illustrated in phantom in FIG. 8. By actuating the solenoid 110, the top portion **27*a* of the container 27 is captured between the solenoid plunger 112 and the opposite side of the bracket 108. The operation of the solenoid 110 is controlled by the controller 54. Preferably, a light sensor 114 (FIG. 4) is mounted adjacent the back edge 101 of the platform 98 for sensing the passage of a boxed food item off the back edge 101 of the platform 98. By appropriately connecting the light sensor 114 to the controller 54 and the solenoid 110, the solenoid 110 is actuated only after the boxed food item falls from the platform 98 and onto the platform 104**.

With reference again to FIG. 8, the unwrapping means 90 also includes a controller-controlled solenoid 116 mounted in a stationary condition upon the platform 104 adjacent the bracket 108 so that upon actuation of the solenoid 116, its plunger 118 moves against the bottom portion **27*b* of the container 27 on the side of the container 27 opposite the solenoid 110. It has been found that by urging the top and bottom portions 27*a*, 27*b* of the container 27 in opposite directions in what may be described as a shearing action, the tab 31 (FIG. 2) of the container 27 is forced out of interlocking relationship with the container slot 33. It is this shearing action which is simulated as the bracket 108, with the solenoid 110, holds the container top portion 27*a* stationary while the solenoid 116 urges the container bottom portion 27***b* rightwardly, as viewed in FIG. 8, to unlock the top and bottom portions 27*a*, 27*b*. Following activation of the solenoid 116 so that the top and bottom portions 27*a*, 27*b* are unlocked, the controller 54 deactuates the solenoid 116 so that the top and bottom portions 27*a*, 27*b* are left in an unlocked condition.

With reference again to FIG. 9, the unwrapping means 90 also includes a stepping motor 120 connected in driving relationship with the pivot arm 107 so that upon deactivation of the solenoid 116, the pivot arm 107 is raised upwardly toward its FIG. 9 phantom-line position. Since the top portion 27*a* remains captured within the bracket 108, the top portion 27*a* is raised with the bracket 108. As the top portion 27*a* continues its upward movement, the bottom portion 27*b* is permitted to swing downwardly relative to the top portion 27*a* under the weight of the food item contained therein so that the food item is dumped from the container 27.

Mounted within the lower platform 104 is a trap door assembly 121, best shown in FIG. 4, including a trap door 122 positioned generally below the bracket 108 when the bracket 108 is positioned in its FIG. 9 lowered position. A grinding apparatus 124 is positioned beneath the trap door 122 into which the food item which is dumped from the container 27 is permitted to fall. A reversible motor 126 is suitably connected to the trap door 122 so that upon energizing the motor 126 in one rotational direction and the other rotational direction, the trap door 122 is moved between a closed position, as illustrated in solid lines in FIG. 4, and an open position, as illustrated in phantom in FIG. 4. The operation of the trap door motor 126 and the grinding apparatus 124 is controlled by the controller 54 so that upon de-activation of the solenoid 116, the trap door 122 is opened and the grinding apparatus 124 is energized. Upon subsequent return of the bracket 108 from its raised position to its lowered position, the trap door 122 is closed and the grinding apparatus 124 is deactivated. In the depicted system 20, a removable container 127 is situated beneath the grinding apparatus 124 for collecting the ground food items which exit the bottom of the grinding apparatus 124. This collected product may be used for consumption by animals.

With reference again to FIG. 9, the container 27 is carried by the bracket 108 to a position at which the container 27 can be deposited upon the conveyor 109 with both of the top and bottom portions 27*a*, 27*b* opening downwardly. To this end, the bracket 108 is permitted to pivot relative to the arm 107 under the weight of the container 27 so that by the time the bracket 108 has moved to its raised position above the conveyor 109, the top and bottom portions 27*a*, 27*b* open generally downwardly toward the conveyor 109 as illustrated in FIG. 8. Upon reaching the phantom in FIG. 9. Upon reaching the FIG. 9 raised (phantom-line) position, the solenoid 116 is deactuated so that the container 27 is permitted to fall upon the conveyor 109, and then the motor 120 is used to return the bracket 108 to its lowered position for acceptance of another food item delivered to the platform 104 by the rack 100. The operation of the motor 120 is controlled by the controller 54, and the rotation of the rack 100 and movement of the pivot arm 107 is synchronized so that a food item is delivered to the platform 104 only when the bracket 108 is positioned in its lowered position.

Figure 9:
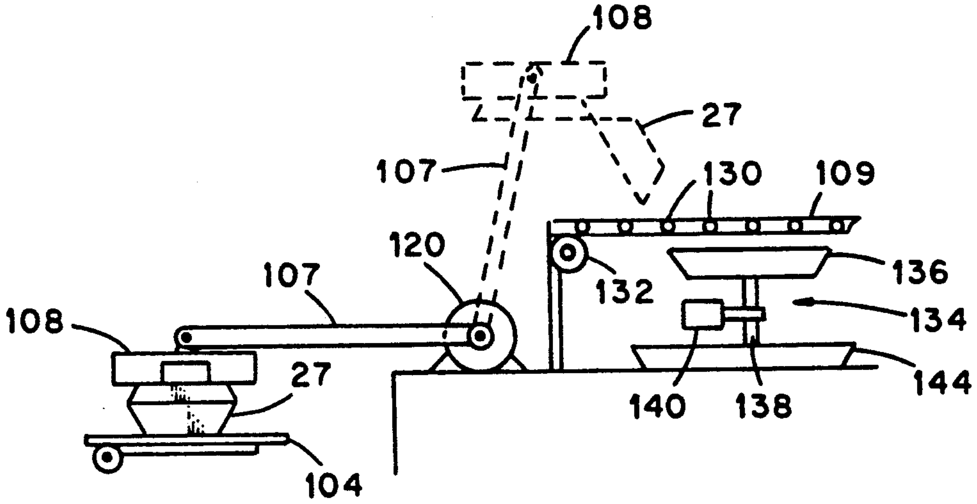
FIG. 9 is a view of a fragment of one unwrapping means of the FIG. 1 system as shown in FIG. 4 but drawn to a slightly larger scale.

With reference to FIGS. 4 and 9, the conveyor 109 is supported in an elevated condition by the frame 26 and includes a plurality of rollers 130 which are suitably geared to one another and to a motor 132 so that upon actuation of the motor 132, the container 27 positioned upon the rollers 130 is moved toward and off of one end, or the right end as viewed in FIG. 4. In the depicted system, a water spray system 134 including a spray head 136 is mounted beneath the conveyor 109 and directed generally upwardly so that water exiting the head 136 is forced against the downwardly-opening portions 27*a*, 27*b* of the container 27 in a cleaning operation. The spray system 134 includes appropriate piping 138 connectible to a source of water under pressure, and a solenoid-actuated valve 140 is incorporated within the piping 138 and appropriately connected to the controller 54 so that upon actuation of the conveyor motor 132, water is sprayed from the head 136 against the container portions 27*a*, 27*b*. Preferably, the frame 26 includes a drainage system having a collection drain 144 disposed generally below the spray head 136 so that water which is sprayed from the head 136 and subsequently flows downwardly exits he system 20 through the collection drain 144.

The system 20 also include means, generally indicated 146 in FIG. 4, for drying the container portions 27*a*, 27*b* after they have been cleaned by the spray system 134. As depicted in FIG. 4, the drying means 146 includes an electric resistance element 148 mounted below and adjacent the conveyor 109 so that as the container portions 27*a*, 27*b* are conveyed across the drying means 146, the container portions 27*a*, 27*b* are exposed to the heat generated by the element 148. The drying means 146 also includes a fan 150 powered by an electric motor 152 situated generally beneath the electric resistance element 148. As the container portions 27*a*, 27*b* are conveyed across the resistance element 148, the fan 150 forces air which has been heated by the element 148 against the container portions 27*a*, 27*b* in an enhanced drying operation. Operation of the fan 150, motor 152 and heater element 148 is controlled by the controller 54 and synchronized with the movement of the conveyor 109.

The system 20 also includes a storage drawer 154 situated to the right side, as viewed in FIG. 4, of the conveyor 109 so that upon conveyance of the cleaned container portions 27*a*, 27*b* off of the conveyor 109, the containers 27 are collected by the drawer 154. To this end, the drawer 154 has an open top disposed below the horizontal level of the conveyor 109, and a chute 156 is supported between the conveyor 109 and the top of the drawer 154 so that containers 27 directed off the conveyor 109 are routed by the chute 156 into the drawer 154.

As mentioned earlier and with reference to FIGS. 6 and 7, the unwrapping means 92 is adapted to unwrap food items which have been wrapped within a sheet 35 (FIG. 3) of wrapping material. The unwrapping means 92 includes a platform 160 and a revolving rack 162 to which the sheet-wrapped food items are directed by way of the chute 96, introduced earlier. The rack 162 is identical in construction and operation to the aforedescribed rack 100 in that it accepts and conveys food items delivered through the chute 96 one-at-a-time off of the back edge of the platform 160 onto a lower platform 164 situated below and adjacent the platform 160. Situated within the platform 164 is a trap door 166 which is suitably connected to a reversible motor 168 so that actuation of the motor 168 in one direction moves the trap door 166 from a closed position as illustrated in solid lines in FIG. 6 to an open position as illustrated in phantom in FIG. 6, and actuation of the motor 168 in the opposite direction moves the trap door 166 from its opened position to its closed position.

Figure 10:
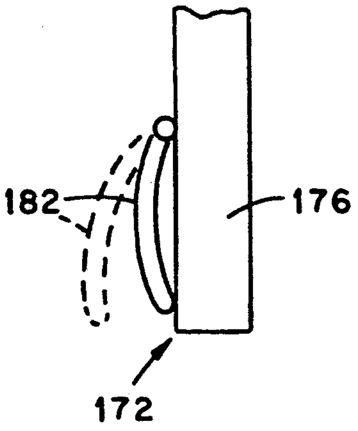
FIG. 10 is a side view of a fragment of the rotating clamp assembly of the FIG. 1 system.
Figure 11:
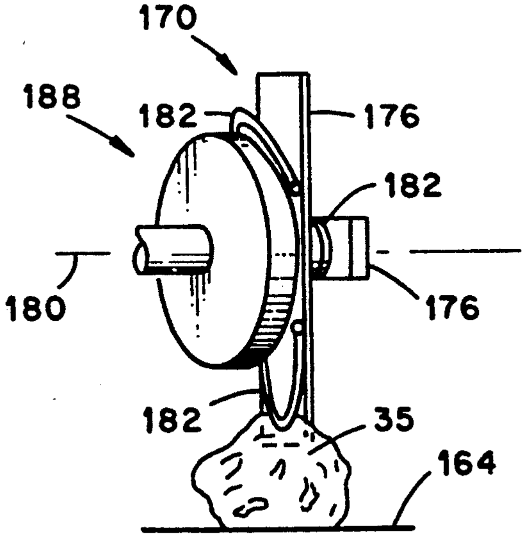
FIG. 11 is a perspective view of a camming arrangement used for moving the clamps of the rotating clamp assembly of the FIG. 1 system between opened and closed conditions.

Supported above the platform 164 by the frame 26 is a rotating clamp assembly 170 including a plurality of clamps 172 for clamping the sheet 35 wrapped about the food item and lifting the sheet 35 from the food item to an elevated position above a hopper 174. In the depicted system 20 and as best shown in FIG. 10, each clamp 172 includes a strut 176 extending radially of the assembly 170 and a jaw 182 which is mounted for movement of one of its ends toward and away from the strut 176. A motor 178 (FIG. 6) supported by the frame 26 is connected in driving relationship with the assembly 170 for rotating the assembly 170 about an axis 180. Although the movement of the jaw 182 toward and away from the strut 176 can be effected by any of a number of means, each jaw 182 of the depicted system 20 engages a camming arrangement 188 (shown in FIG. 11 but not in FIG. 6) for mechanically moving the jaws 182 toward and away from the strut 176 as the assembly 170 is rotated about its axis 180. Each jaw 182 is spring-biased against the camming arrangement 188 and is moved by the arrangement 188 to a closed position as the assembly 170 is rotated so that its strut 176 is directed downwardly and is moved by the arrangement 188 to an opened position as the assembly 170 is rotated so that its strut 176 is directed generally horizontally and disposed above the hopper 174.

During use of the unwrapping means 92, a sheet-wrapped food item is directed into the rack 162 by way of the chute 96 and is subsequently conveyed by the rack 162 onto the lower platform 164. As the food item is positioned upon the platform 164, the rotating assembly 170 moves about its axis 180 bringing one of its clamps 172 into clamping relationship with the sheet 35 wrapped about the food item. In this connection, one of the jaws 182 moves against its corresponding strut 176 as it moves across the food item in a manner illustrated in FIG. 11 which pinches the sheet 35 15 between the jaw 182 and the strut 176. As the assembly 170 continues to be rotated, the sheet 35 is lifted so that the food item is permitted to fall from the sheet 35 under its own weight. If desired, vibrating means may be joined to the assembly 170 to vibrate the assembly 170 during rotation and thereby facilitate the gravitational separation of the food item from its wrapping sheet 35. Upon raising the sheet 35 to a position above the hopper 174, the jaw 182 moves away from the strut 176 to permit the sheet 35 to fall into the hopper 174 for collection. If desired, a shredder may be incorporated with the hopper 174 for shredding the sheets 35 dropped into the hopper 174.

Upon rotational movement of the assembly 170 to a position at which the sheet 35 is lifted from a food item and with reference again to FIG. 6, the trap door motor 168 is actuated to open the trap door 166 so that the food item which is permitted to fall from the sheet 35 passes through the trap door 166 for collection. If desired, a grinding apparatus 196 may be situated beneath the platform 164 for grinding the food items which pass through the trap door 166. The trap door 166 is returned to its closed position after a period of time sufficient to permit the food item to pass therethrough to prepare the platform 164 for acceptance of another food item delivered thereto by the rack 162. The operation of the aforementioned electrical components associated with the unwrapping means 92 is controlled by the controller 54, and the rotation of the rack 162 and assembly 170 is synchronized so that only one food item is delivered to the platform 164 for each pass of a clamp 172 across the platform 164.

It follows from the foregoing that the aforedescribed system 20 accomplishes its intended objects in that it stores and warms wrapped food items until sold or until the passage of a predetermined limit of time. If not sold by the predetermined limit of time, a food item is directed into the lower section 24 of the system 20 where the food item is separated from its wrapping and divided into edible and non-edible refuse.

It will be understood that numerous modifications and substitutions can be had to the aforedescribed embodiment without departing from the spirit of the invention. For example, the aforedescribed system 20 may include additional features which may facilitate its use. Such additional features as illustrated in FIG. 1 may include a storage compartment 210 for drinking cups, a counter system having a display 208 for monitoring the number of cups remaining within the compartment 210, storage cabinets 212, 213 for cold food items and digital displays 214 and 216 mounted atop the upper section 22 adjacent the front and back, respectively, of the system 20. Mounted within the storage cabinets are sensors for sensing the presence of cold food items therein and the controller 54 is connected to these sensors for monitoring the number of cold food items contained within the cabinets 212, 213. The displays 214, 216 are operatively connected to an input terminal, such as the keyboard 55, enabling advertising material or the like to be displayed by the front display 214 for viewing by a customer stationed in front of the system 20 and instructional information to be conveyed to cooks or short-order personnel stationed behind the system 20 by way of the back display 216. Accordingly, the aforedescribed embodiment is intended for the purpose of illustration and not as limitation.

I claim:

1. A shelving and cycling system for a wrapped food item comprising:

a frame;

an elongated shelf for storing a wrapped food item and including an entrance end through which a wrapped food item is placed into the shelf and an exit end through which a wrapped food item is removed from the shelf, the shelf being supported by the frame in a canted orientation so that a wrapped food item placed onto the shelf through the entrance end is gravitationally directed toward the exit end of the shelf;

a gate assembly associated with the shelf including a gate movably mounted adjacent the exit end of the shelf for movement between a closed position at which the gate prevents the food item for gravitationally exiting the shelf through the exit end thereof and an opened position at which the food item is permitted to gravitationally move through the exit end of the shelf and means for moving the gate between the opened and closed positions;

means associated with the gate moving means for initiating movement of the gate to its opened position upon the occurrence of a predetermined event to permit the food item to gravitationally exit the exit end of the shelf; and sensor means associated with the shelf for sensing the presence of a food item positioned within the shelf, and the associated means is connected to the sensor means for monitoring the period of time that a food item is positioned within the shelf and for initiating the movement of the gate to its opened position upon the passage of the prescribed period of time.

2. The system as defined in claim 1 wherein the sensing means includes a sensor disposed adjacent the exit end of the shelf for sensing the presence of a food item adjacent the gate for monitoring the food item which has been positioned within the shelf for the longest period of time.

3. The system as defined in claim 2 wherein the gate assembly is a first gate assembly, the gate of the first gate assembly is a first gate and the system includes a second gate assembly including a second gate movably mounted at a predetermined location along the length of the shelf intermediate of the entrance end and exit end thereof for movement between a closed position at which the second gate prevents a food item from gravitationally advancing along the shelf toward the exit end thereof and an opened position at which the food item is permitted to gravitationally move past the second gate toward the exit end of the shelf and means for moving the second gate between its opened and closed positions, and said associated means is connected to the means for moving the second gate for initiating the movement of the second gate to its opened position upon the closing of the first gate so that a food item positioned adjacent the second gate is permitted to advance along the shelf toward the gate of the first gate assembly.

4. The system as defined in claim 1 further comprising separating means supported by the frame for separating the food item from its wrapping, and means interposed between the exit end of the shelf and the separating means for routing the wrapped food item which is directed off the exit end of the shelf to the separating means.

5. The system as defined in claim 4 wherein the wrapped food item is wrapped in a relatively thin sheet of wrapping material and the separating means is adapted to grasp the thin sheet and move the thin sheet in a manner which permits the food item to gravitationally separate from the sheet.

6. The system as defined in claim 4 wherein the wrapping of the wrapped food item is a box-like container having a top portion and a bottom portion which are joined to one another with a hinge along one side of the container and interlocked with a tab on the side of the box opposite the hinge, and the separating means is adapted to grasp one of the top and bottom portions of the container, dislodge the top and bottom portions from their interlocked conditions and move the grasped container portion in a manner which permits the food item to gravitationally separate from the container.

7. The system as defined in claim 1 further including means for heating food items positioned within the shelf.

8. The system as defined in claim 7 wherein the shelf includes a floor and the heating means includes a steam generator for generating steam, and the system further includes a conduit connected between the steam generator and the shelf for conducting steam from the generator to the shelf where the floor of the shelf is heated by the generated steam.

9. A food warmer and cycling system for wrapped food items comprising:

a frame;

an upper section including a plurality of elongated shelves arranged in a side-by-side arrangement and supported by the frame so that one end of each shelf is elevated above the other end of the shelf, the elevated end of the shelf providing an entrance end through which a wrapped food item is placed into the shelf and the lower end of the shelf providing an exit end through which a wrapped food item is removed from the shelf so that a wrapped food item placed into the shelf through the entrance end is gravitationally directed toward the exit end of the shelf;

gate means including a first gate movably mounted adjacent the exit end of each shelf for movement between a closed position at which the first gate prevents a food item from gravitationally exiting the shelf through the exit end thereof and an opened position at which the food item is permitted to gravitationally move through the exit end of the shelf and means for moving the first gate between its opened and closed positions;

said gate means including a second gate movably mounted intermediate of the entrance end and exit end of each shelf for movement between a closed position at which the second gate prevents the advance of a food item positioned adjacent the second gate toward the shelf exit end and an opened position at which a food item positioned adjacent the second gate is permitted to gravitationally move past the second gate toward the exit end of the shelf and means for moving the second gate between its opened and closed positions; and means associated with the means for moving the first and second gates for initiating movement of each of the first gate and the second gate to its opened position upon the occurrence of a predetermined event to permit a food item to gravitationally move along or off of the shelf.

10. The system as defined in claim 9 further comprising sensor means associated with the shelf for sensing the presence of a food item positioned within the shelf, and the associated means connected to the sensor means for monitoring the period of time that a food item is positioned within the shelf and for initiating the movement of at least one of the gates to its opened position upon the passage of a predetermined period of time.

11. The system as defined in claim 10 further comprising a storage area for cold food items and the associated means includes a controller for monitoring the number of cold food items contained within the storage area.

12. The system as defined in claim 9 wherein the sensing means includes a sensor disposed adjacent the exit end of the shelf for sensing the presence of a food item adjacent the gate for monitoring the food item which has been positioned within the shelf for the longest period of time.

13. The system as defined in claim 9 further comprising separating means supported by the frame for separating the food item from the wrapping, and means interposed between the exit end of the shelf and the separating means for routing the wrapped food item which is directed off the exit end of the shelf to the separating means.

14. The system as defined in claim 13 wherein the wrapped food item is wrapped in a relatively thin sheet of wrapping material and the separating means is adapted to grasp the thin sheet and move the thin sheet in a manner which permits the food item to gravitationally separate from the sheet.

15. The system as defined in claim 13 wherein the wrapping of the wrapped food item is a box-like container having a top portion and a bottom portion which are joined to one another with a hinge along one side of the container and interlocked with a tab on the side of the box opposite the hinge, and the separating means is adapted to grasp one of the top and bottom portions of the container, dislodge the top and bottom portions from their interlocked conditions and move the grasped container portion in a manner which permits the food item to gravitationally separate from the container.

16. The system as defined in claim 13 further including means for heating food items positioned within the shelf.

17. The system as defined in claim 16 wherein the shelf includes a floor and the heating means includes a steam generator for generating steam, and the system further includes a conduit connected between the steam generator and the shelf for conducting steam from the generator to the shelf where the floor of the shelf is heated by the generated steam.

* * * * *